Patented Oct. 10, 1944

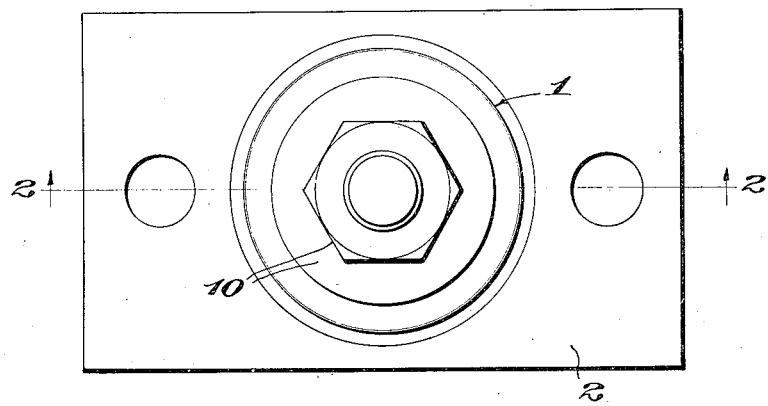
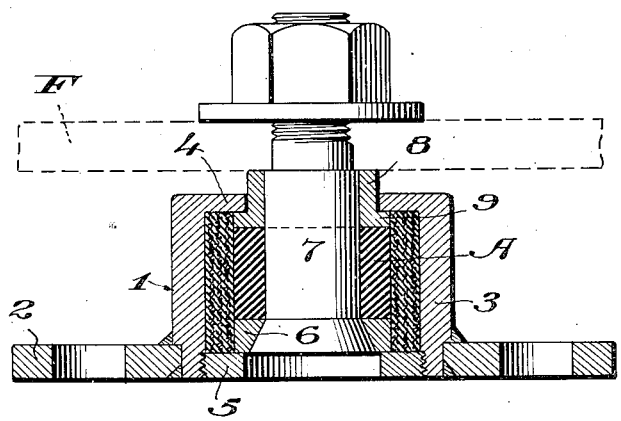
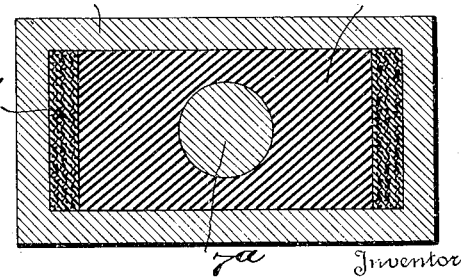
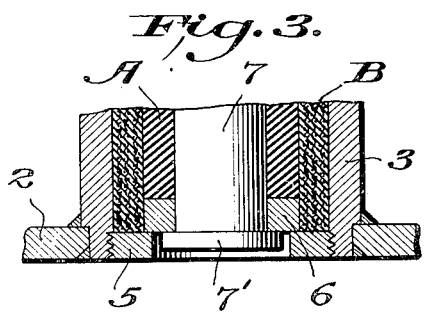

2,359,942

UNITED STATES PATENT OFFICE 2,359,942

SHOCK ISOLATOR

Siegfried Rosenzweig, New York, N. Y.

Application May 14, 1943, Serial No. 487,028

5 Claims. (Cl. 248—22)

This invention relates to vibration or shock absorbing mountings for machinery.

More especially, the invention resides in the novel combination and arrangement of non-metallic shock absorbing members formed of materials whose characteristics conform to the law of physics known as Poisson's ratio which is defined in "Vibration Prevention in Engineering" (Arthur L. Kimball) in part, as follows:

"If a bar of elastic material is stretched or compressed by a small amount, its diameter does not remain constant, but decreases slightly with tension and increases with compression. The ratio of this sideways contraction or expansion of a unit cube to the corresponding stretch or compression is a constant for the material; it is called Poisson's ratio . . . If elastic deformation is attended by no volume change, Poisson's ratio has the value of almost exactly ½. This condition is very nearly fulfilled by rubber and gelatin."

The definition also states that rubber and gelatin are very resistant to volume compression, and that cork, which "can be compressed along its axis by a large amount and show practically no change of diameter" has a Poisson ratio value of 0.00 while rubber in the same scale has the value of 0.50.

The invention, therefore, in its basic aspects, is directed to a construction wherein the novel features reside in the juxtaposition of non-metallic elastic elements, one of which is incompressible when confined, for example, rubber, while the other is relatively compressible even when confined, for example, a laminated rubberized fabric whereby through the medium of the relatively incompressible material long deflection may be obtained in an axial direction while at the same time its lateral expansion will result in only a slight deflection of the other material and a resistance, the magnitude of which is dependent on the amount of its deflection and its modulus of elasticity.

In its more specific phase an object is to provide a construction including means for arranging and confining non-metallic members of different values of Poisson's ratio in layers, that is, side by side relation so that relative movement between a supported machine and its subbase may be obtained by transmitting the shock or load to the confined elastic member of high ratio value which while relatively incompressible as to volume deflects under pressure and expands against the resistance of the elastic member of low ratio value to thus provide support for the machine which effectively absorbs vibration and shock.

Preferred and practical embodiments of the invention are shown in the accompanying drawing, in which:

Fig. 1 is a top plan view of a unit embodying the features of the present invention.

Fig. 2 is a vertical sectional view taken on the line 2—2 of Fig. 1.

Fig. 3 is a detail vertical sectional view illustrating a modified form of bolt head and washer arrangement.

Fig. 4 is a horizontal sectional view illustrating the embodiment of the invention in a rectangular housing.

Similar reference characters designate corresponding parts throughout the several figures of the drawing.

Fundamentally, the invention contemplates confining in juxtaposed relation an elastic non-metallic element A which is incompressible, that is of constant volume and therefore of high Poisson ratio value, and an elastic non-metallic element B which is preferably highly resilient or yieldable and compressible and therefore of low Poisson ratio value, with the element A intended to receive the direct load. In practice the elements A and B may be in the form of tubes or hollow cylinders concentrically arranged (Figs. 1 and 2) so that at least one side of the constant volume element A which is disposed at substantially right angles to the direction of applied force will abut the adjacent surface of the confined element B. The elements A and B may be transposed, that is, reversed as to position, (on the inside or on the outside of the assembly) but in either case the element A receives the direct load. Alternatively, the elements A and B may be made to fit into a rectangular housing, (Fig. 4) that is, the central element may be substantially in the form of a block and assembled in a housing with flat sections or shims confined between the block and the housing.

According to the embodiment of the invention shown in Figs. 1 and 2 of the drawing, a tubular body of rubber (incompressible in volume) designated generally as A and having a Poisson ratio value of substantially 0.50 is used in conjunction with a surrounding tubular body or liner of relatively compressible elastic isolating material B, which may be made of rubberized fabric layers, or equivalent material, and has a Poisson ratio value of substantially 0.05 so that when the constant volume rubber body is subjected to deformation under the impact of load and shock, such deformation in the form of lateral expansion or deflection of the rubber, will be restrained by the resistance of the confined elastic compressible material B.

The rubber content of elements A and B is of the lowest possible Durometer in order to insure least resistance to deflection and is of a grade of material that will allow maximum deflection or movement without harming the texture of the rubber in either case and to insure the return of each element to original form.

As will be observed from Fig. 2, the tubular non-metallic elements A and B are concentrically arranged and suitably housed to provide a unit which may be readily pre-fabricated, according to predetermined specifications and subjected to initial pre-compression at the time of assembly. Accordingly, it is proposed to provide a unit designated generally as 1 and comprising a base 2 and a housing 3 whose lower end is secured in said base while its upper end is flanged inwardly as indicated at 4 to provide an abutment in the upper end of the housing. The lower inner face of the housing 3 is threaded to receive an abutment ring 5 which acts as a stop for the ring washer 6 whose upper face engages the bottom edge of the rubber member A. This washer, in order to reduce the height of the unit, may have its central opening provided with a beveled side wall (Fig. 2) to engage the complemental side wall of the head of an assembly bolt 7. Alternatively the washer 6 may have an opening of uniform diameter and the underside of the bolt head may be flat as shown at 7' in Fig. 3. It will also be seen that the bolt has a body portion whose outer surface engages and therefore provides a rigid confining wall for the inner face of the rubber member A. The upper end of the bolt passes through a flanged load transmitting collar 8 whose flange portion 9 lies beneath the upper abutment flange 4 of the housing while its bottom face engages the upper end of the member A. Moreover, it will be observed that the shank of the bolt 7 has its upper end reduced and threaded to receive a nut and washer combination 10 for the purpose of clamping a part of the machine base or frame F against the upper edge of the collar 8.

With the structural arrangement above described, it will be apparent that the tubular rubber member A is confined sidewise between the outer surface of the bolt 7 and the inner face of the isolating material B, and also, lengthwise between the underside of the flange 9 and the inner face of the washer 6. Also the isolating material B has its outer side portion confined by the inner face of the housing 3 and its inner side portion confined by the outer edge of the washer 6; outer surface of the rubber member A; and the outer edge of the flange 9.

According to the specifications of the unit to be made for a particular installation, the rubber cylinder A and the elastic material B may be pre-compressed to a predetermined degree at the time of assembly. Thus, when the unit is installed, the total deflection under a given static load will include the amount of axial movement due to pre-compression of the elements A and B.

Fig. 4 of the drawing shows the embodiment of the invention in a rectangular housing. The rubber element A' in this case cooperates with the sections or shims B' of isolating material. The bolt 7a and its associated parts are the same as previously described except as to the shape of the loading collar and the follower and the lower housing abutment.

In the event the element A or A' is placed on the outside, that is, next to the housing and the isolating material B or B' is arranged on the inside of the assembly the loading collar 8 or its equivalent will still engage the rubber element A. In other words, the transposition of A and B is possible with the same beneficial results.

When devices according to either form of the invention have been installed beneath a machinery base F, it will be apparent that the load will be carried through the collar 8 and flange 9 to the tubular rubber member A and the latter will be axially deflected proportionately to the degree of magnitude of the static load or loads imposed by the shocks. Since the rubber member A (or A') is of constant volume the change in lateral dimension thereof under load deflection will compress the isolating liner B (or B') and thereby distribute the load over the face of part B which is in contact with the outer face of part A; that is to say, the rubber material A, of comparatively small volume, will deflect axially a certain amount and set up a relatively small compression of material B resulting in a reaction of great magnitude in the surrounding material and thereby permit a comparatively small unit to withstand an impact of great magnitude.

Considering the elements A and B in the terms of elasticity with no change in volume as defined by Poisson's ratio, it will be understood that the elastic element A has the maximum constant value of 0.50 while the member B preferably has a minimum constant value of substantially 0.10 and a maximum of 0.30. In other words the element B may be made of any elastic and resilient material having a lower Poisson ratio than rubber. For instance, rings of spring steel or glass may well take the place of the non-metallic material B.

The advantages of the invention are that, by means of the material A which yields under load but does not change in volume, a relatively long deflection can be obtained while at the same time obtaining a resistance of great magnitude in the material B though it deflects but slightly. The long deflection in the material which receives the initial load, whether static or shock, is of great advantage since in a device of this type long deflection means low frequency, and therefore relatively high vibration absorbing efficiency.

I claim:

1. A shock isolator, including, a tubular housing, fixed abutment means at one end of the housing, a pair of tubular elastic members one of which is incompressible when confined while the other is relatively compressible even when confined, said members being concentrically arranged within the housing, a bolt passing through the inner tubular member and engaging the inner face thereof, means associated with the upper end of the bolt cooperating with said fixed abutment and with the inner tubular member for transmitting load thereto, and co-acting means at the lower end of the bolt and housing cooperating with said last mentioned means and said fixed abutment for placing said tubular elastic members under pre-compression.

2. A shock isolator, including, a rigid housing, a fixed abutment at one end of the housing, a tubular liner of non-metallic elastic isolating material engaging the inner side wall of the housing and having its upper end engaging said abutment, said isolating material being compressible laterally from its inner face, a flanged loading collar within said casing and adjacent said fixed abutment of the housing, a tubular inner member of constant volume elastic material having its outer face engaging the inner face of said liner and having its upper end engaging the inner face of said flanged loading collar, a bolt having its shank portion passing through the inner tubular member and the collar and having its lower end engaged with a washer whose inner face engages the lower end of the inner tubular elastic member, and an abutment ring adjustably fitted in the lower end of said housing and engaging the lower edge of the liner and the inner face of said ring washer.

3. In a shock isolator, a base member, a loading member for carrying a vibrating load, a housing having non-elastic walls and mounted on the upper face of said base member, a first elastic member mounted within said housing in spaced relation to opposite lateral walls thereof, a second elastic centrally apertured member mounted in said housing in the space between said first elastic member and the opposite lateral walls of said housing, and means for transmitting the load to said first elastic member, said first elastic member being formed of material which is substantially incompressible in volume, and said second elastic member being formed of material which is relatively compressible.

4. A shock isolator for mounting machinery bases or the like on a foundation, including, a rigid casing on the foundation, inner and outer elastic non-metallic members within the casing, one of said members being incompressible when confined and the other being relatively compressible when confined, means constituting a part of the rigid casing for confining the outer member on three sides, and rigid means connected with the machinery base for confining the inner member on three sides, the fourth side of both members being juxtaposed and unconfined except by each other, whereby, when the member which is incompressible when confined is subjected to load, its lateral expansion will be resisted by the member which is relatively compressible when confined.

5. A shock isolator for mounting machinery bases or the like on a foundation, including, a rigid casing on the foundation, an inner member of elastic material which is incompressible when confined and an outer member of elastic material which is relatively compressible when confined, means constituting part of the rigid casing for confining the outer member on three sides, and rigid means connected with the machinery base for confining the inner member on three sides and subjecting the same to load, the fourth side of both members being in engagement and unconfined except by each other, whereby, when the member which is incompressible when confined is deformed under load, its lateral expansion will be resisted by the member which is relatively compressible when confined to absorb shock.

SIEGFRIED ROSENZWEIG.